US012688154B2

(12) United States Patent
Melinamane et al.

(10) Patent No.: US 12,688,154 B2
(45) Date of Patent: Jul. 21, 2026

(54) FILE CLONE CREATION FOR MULTIPART FILES

(71) Applicant: NetApp, Inc., San Jose, CA (US)

(72) Inventors: Gururaj Jayaram Melinamane, Bangalore (IN); Sumith Makam, Kundanahalli (IN); Boopathy Krishnamoorthy, Bangalore (IN)

(73) Assignee: NetApp, Inc., San Jose, CA (US)

( * ) Notice: Subject to any disclaimer, the term of this patent is extended or adjusted under 35 U.S.C. 154(b) by 2 days.

(21) Appl. No.: 18/786,752

(22) Filed: Jul. 29, 2024

(65) Prior Publication Data

US 2026/0030206 A1     Jan. 29, 2026

(51) Int. Cl.
*G06F 16/00*     (2019.01)
*G06F 11/1446*     (2026.01)
*G06F 16/16*     (2019.01)

(52) U.S. Cl.
CPC .......... *G06F 16/16* (2019.01); *G06F 11/1458* (2013.01); *G06F 2201/84* (2013.01)

(58) Field of Classification Search
CPC ... G06F 16/16; G06F 11/1458; G06F 2201/84
USPC ........................................................ 707/654
See application file for complete search history.

(56) References Cited

U.S. PATENT DOCUMENTS

| | | | |
|---|---|---|---|
| 9,182,921 | B2 | 11/2015 | Sivakumar et al. |
| 10,242,025 | B2 * | 3/2019 | Shetty .................. G06F 16/178 |
| 10,360,099 | B2 | 7/2019 | Subramanian et al. |
| 10,481,983 | B1 * | 11/2019 | Miah ..................... G06F 16/128 |
| 10,521,143 | B2 | 12/2019 | Subramanian et al. |
| 11,036,420 | B2 | 6/2021 | Thoppil et al. |
| 11,048,430 | B2 | 6/2021 | Thoppil et al. |
| 11,132,339 | B2 | 9/2021 | Kaushik et al. |
| 11,151,162 | B2 | 10/2021 | Narasingarayanapeta et al. |
| 11,210,013 | B2 | 12/2021 | Thoppil et al. |
| 11,397,650 | B1 | 7/2022 | Palaiah et al. |
| 11,615,001 | B2 | 3/2023 | Naidu et al. |
| 11,650,886 | B2 | 5/2023 | Mathew et al. |
| 11,853,104 | B2 | 12/2023 | Naidu et al. |

(Continued)

OTHER PUBLICATIONS

"FabricPool tier management", NetApp, URL: https://docs.netapp.com/us-en/ontap/pdfs/sidebar/FabricPool_tier_management.pdf, Apr. 16, 2024, 58 pages.

(Continued)

*Primary Examiner* — Monica M Pyo
(74) *Attorney, Agent, or Firm* — Cooper Legal Group, LLC

(57) ABSTRACT

Techniques are provided for creating file clones of multipart files. Creating clones of files is an integral part of providing backup, restore, and other storage services. However, conventional file cloning techniques are unable to create clones of multipart files that are composed of multiple parts stored across different volumes and/or nodes in a constant time. The disclosed techniques are capable of cloning multipart files by creating a clone parent file into which catalog entries from a source multiple file are moved. A destination multipart file is initially created as an empty clone of the source multipart file. Block sharing of the catalog entries from the clone parent file to the source and destination multipart files is performed, and cloning of the source multipart file is declared complete in a constant time such as within a few seconds or less.

20 Claims, 12 Drawing Sheets

(56)                    References Cited

U.S. PATENT DOCUMENTS

| | | | |
|---|---|---|---|
| 2017/0323087 | A1 | 11/2017 | Kline et al. |
| 2018/0332042 | A1 | 11/2018 | Yu et al. |
| 2022/0027321 | A1* | 1/2022 | Narasingarayanapeta .................. H04L 67/1095 |
| 2022/0138169 | A1* | 5/2022 | Yelheri ................. G06F 16/182 707/695 |
| 2022/0217143 | A1 | 7/2022 | Williams et al. |
| 2023/0019437 | A1* | 1/2023 | Yonekura ................ H04L 67/06 |
| 2023/0032814 | A1 | 2/2023 | Pandurangan |
| 2023/0412367 | A1 | 12/2023 | Bennison |

OTHER PUBLICATIONS

"HA pair management", NetApp, URL: https://docs.netapp.com/us-en/ontap/pdfs/sidebar/HA_pair_management.pdf, Apr. 16, 2024, 26 pages.

"SVM data mobility", NetApp, URL: https://docs.netapp.com/us-en/ontap/pdfs/sidebar/SVM_data_mobility.pdf, Apr. 16, 2024, 14 pages.

* cited by examiner

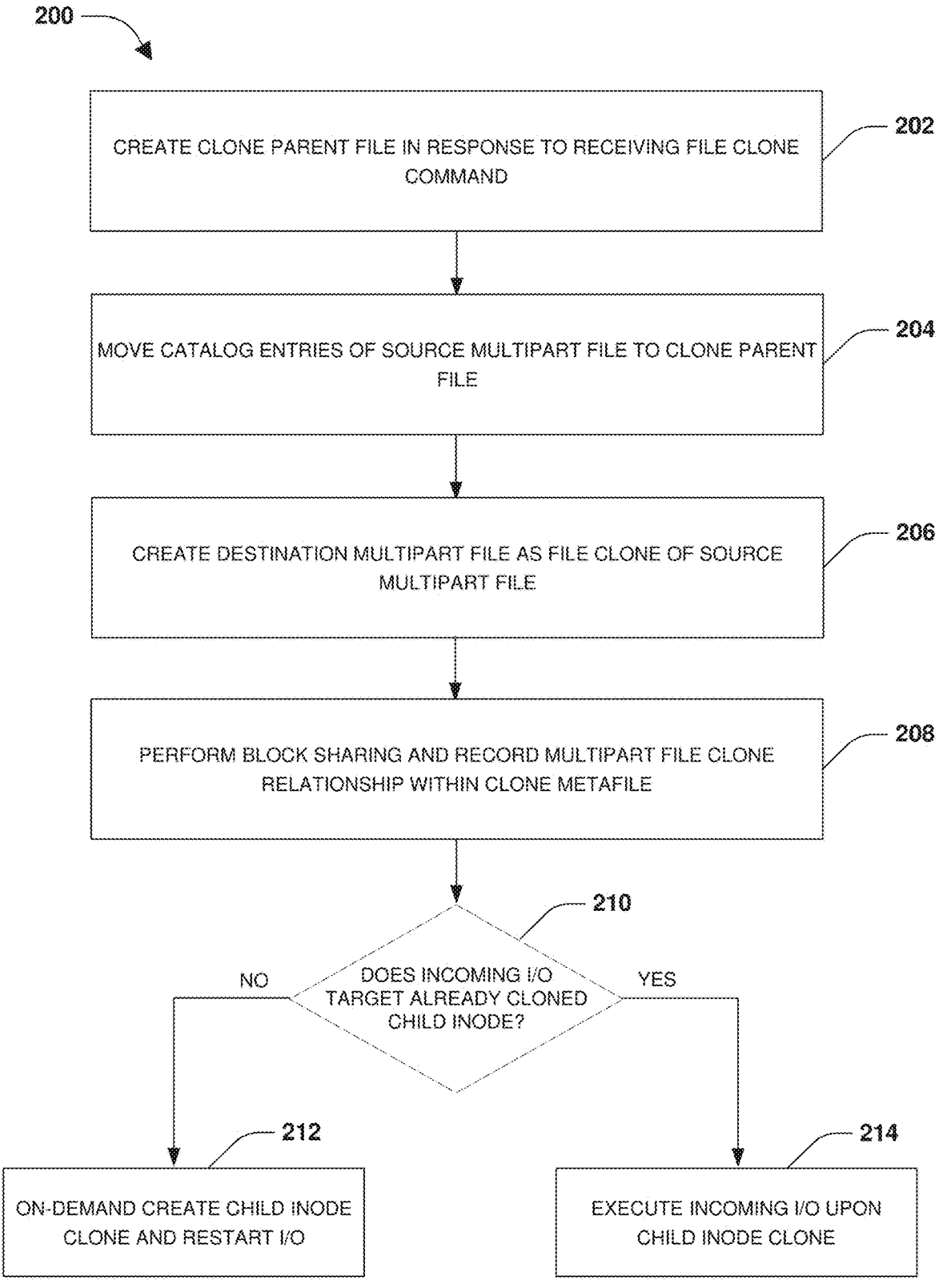

200

CREATE CLONE PARENT FILE IN RESPONSE TO RECEIVING FILE CLONE COMMAND — 202

MOVE CATALOG ENTRIES OF SOURCE MULTIPART FILE TO CLONE PARENT FILE — 204

CREATE DESTINATION MULTIPART FILE AS FILE CLONE OF SOURCE MULTIPART FILE — 206

PERFORM BLOCK SHARING AND RECORD MULTIPART FILE CLONE RELATIONSHIP WITHIN CLONE METAFILE — 208

DOES INCOMING I/O TARGET ALREADY CLONED CHILD INODE? — 210

NO

YES

ON-DEMAND CREATE CHILD INODE CLONE AND RESTART I/O — 212

EXECUTE INCOMING I/O UPON CHILD INODE CLONE — 214

FIG. 2

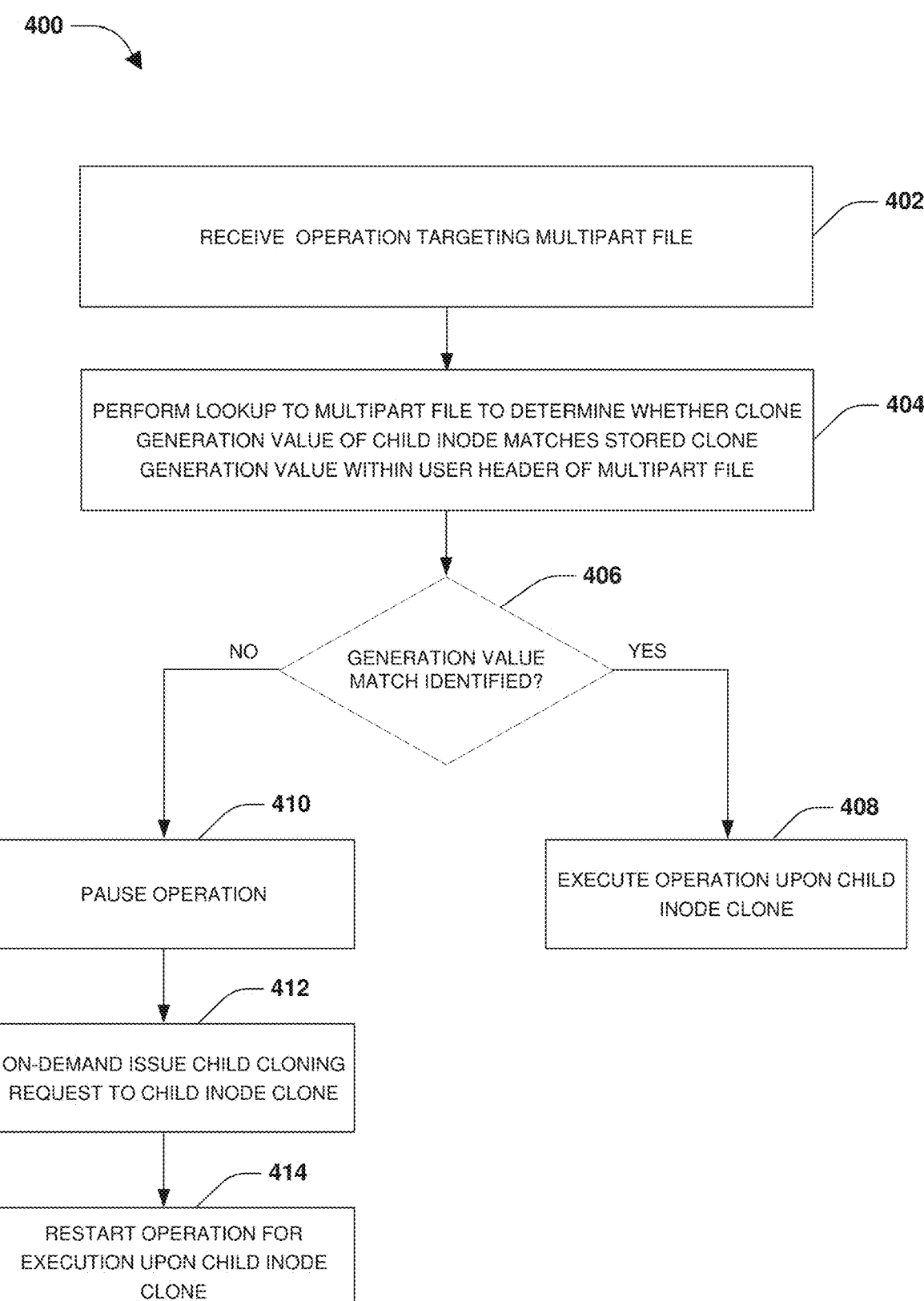

400

402

RECEIVE OPERATION TARGETING MULTIPART FILE

404

PERFORM LOOKUP TO MULTIPART FILE TO DETERMINE WHETHER CLONE GENERATION VALUE OF CHILD INODE MATCHES STORED CLONE GENERATION VALUE WITHIN USER HEADER OF MULTIPART FILE

406

GENERATION VALUE MATCH IDENTIFIED?

NO

YES

408

EXECUTE OPERATION UPON CHILD INODE CLONE

410

PAUSE OPERATION

412

ON-DEMAND ISSUE CHILD CLONING REQUEST TO CHILD INODE CLONE

414

RESTART OPERATION FOR EXECUTION UPON CHILD INODE CLONE

CLIENT

506

OPERATION

516

RESPONSE

504

NODE

102

FILE CLONE MODULE

514

EXECUTE

SOURCE MULTIPART FIE

508

CLONE PARENT FILE

510

DESTINATION MULTIPART FILE

512

600

502

CLIENT

506

OPERATION

504

NODE

102

FILE CLONE MODULE

614

CHILD CLONING REQUEST

SOURCE MULTIPART FIE

508

CLONE PARENT FILE

810

DESTINATION MULTIPART FILE

512

600

502

CLIENT

506

OPERATION

516

RESPONSE

504

NODE

102

FILE CLONE MODULE

620

EXECUTE

SOURCE MULTIPART FIE

508

CLONE PARENT FILE

510

DESTINATION MULTIPART FILE

512

900

902

904

COMPUTER
INSTRUCTIONS

906

01010010001010
10101010010101
001001010100...

908

COMPUTER READABLE
MEDIUM

FILE CLONE CREATION FOR MULTIPART FILES

TECHNICAL FIELD

Various embodiments of the present technology relate to creating file clones of multipart files.

BACKGROUND

Many storage services provide the ability to clone files. File clones may be created for backup, restore, and other storage purposes. Clients of a storage service may have an expectation that file clones will be created within a constant time regardless of file size or the number of files to clone. Conventional file cloning functionality is capable of creating any number of file clones in a constant time (e.g., 50 clones or 5,000 clones can be created within seconds or less). The creation of file clones in constant time is accomplished through the implementation of block sharing. Data of a file is stored within blocks on a storage device. When the file is cloned to create a file clone, the blocks of data are not duplicated for the file clone. Instead, the file clone is initially created to point to the blocks storing the data of the file. Thus, any number of file clones can be quickly created in constant time without consuming much additional storage. As the file or file clone is modified such as by write operations, the modified data is stored within different blocks from the blocks storing the original data. In this way, a storage service or system is capable of creating and storing file clones that can be used for various storage purposes such as backup and restore.

DESCRIPTION OF THE DRAWINGS

Embodiments of the present technology will be described and explained through the use of the accompanying drawings in which:

FIG. 2 is a flow chart illustrating an embodiment of a method for creating file clones of multipart files, in accordance with various embodiments of the present technology.

FIG. 4 is a flow chart illustrating an embodiment of a method for creating file clones of multipart files, where an operation is executed upon a multipart file, in accordance with various embodiments of the present technology.

Figure 1A:
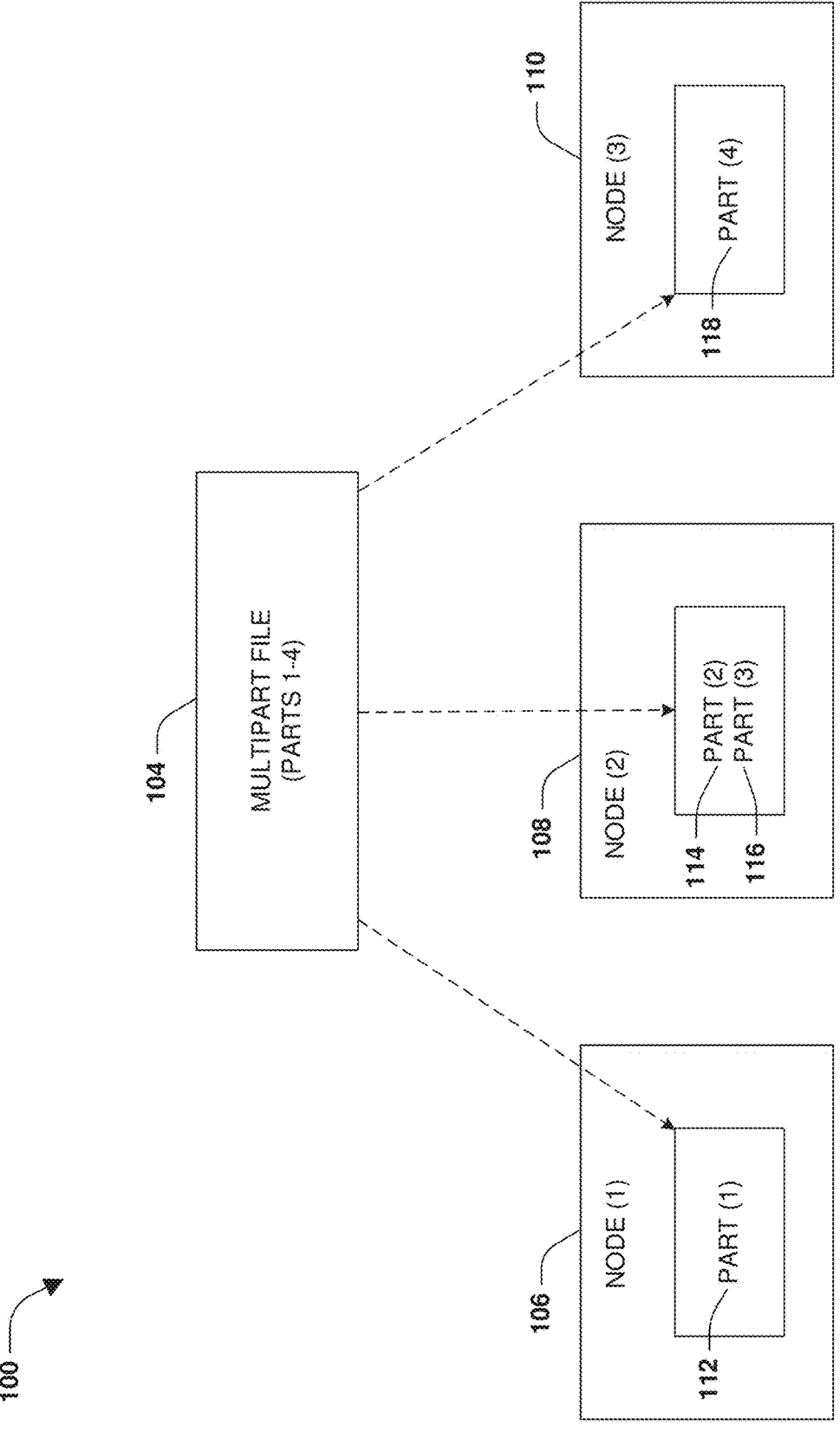
FIG. 1A is a block diagram illustrating an embodiment of a system for maintaining a multipart file that includes a plurality of parts stored across different nodes, in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to creating file clones of multipart files. Conventional files are generally stored within a volume. A client can mount to the volume in order to create, access, and modify the files within the volume. Over time, the volume can grow in size such that a maximum size for the volume could be reached. This volume size limitation becomes problematic at scale as more files and larger files are stored within the volume. In order to overcome these technical limitations of conventional files, multipart files can be used to store data. Unlike a single file, the multipart file is composed of multiple parts. The parts can be stored across multiple volumes (e.g., a first part stored within a first volume, a second part stored within a second volume, a third part stored within a third volume, etc.). The volumes can be stored across different nodes of a cluster such as for load balancing and performance reasons. Parts can be dynamically added, removed, or modified from the multipart file. In this way, the multipart file can dynamically scale and grow with new parts in order to accommodate files that grow over time so that a maximum volume size limit is no longer a constraint on the size of files.

Conventional file cloning techniques are capable of cloning single files in a constant time by creating file clones that share blocks of data of the original file being cloned. The file clones can be created in constant time irrespective of the size of the original file or how many file clones are being created because the block sharing can be performed very quickly for any number of file clones. However, conventional file cloning techniques are incapable of creating clones of multipart files in constant time because a multipart file includes multiple parts that are stored across multiple volumes and/or nodes of a cluster. Each part must be individually cloned, which can be time consuming because the parts may be spread across multiple volumes and/or nodes. Thus, conventional file cloning techniques will fail to satisfy client backup and recovery requirements (e.g., a clone must be created within a few seconds or less) because the multipart files cannot be cloned in a constant time.

The disclosed techniques overcome these disadvantages of conventional file cloning techniques by declaring a file clone command for a source multipart file complete once catalog entries have been moved (cloned) from the source multipart file to a clone parent file, and have been shared from the clone parent file to the source multipart file and a destination multipart file created as the file clone. The cloning of the underlying parts of the source multipart file to the destination multipart file is performed after the file clone command has been declared complete. The cloning of the underling parts may be performed through a background process. In this way, the file clone command for cloning the source multipart file can be declared complete within a constant time (e.g., within a second seconds or less). The disclosed multipart cloning technique can more efficiently creates file clones of multipart files and significantly reduces the time to clone the multipart files so that client backup and recovery requirements (service level agreements with clients) can be satisfied. As part of cloning the parts of the source multipart file to the destination multipart file, various considerations such as load balancing and performance can be taken into account so that the cloned parts are selectively stored at certain nodes. For example, the parts may be cloned to nodes that have available storage and processing resources for storing and providing client access to the destination multipart file, as opposed to nodes that are overburdened or resource constrained.

Figure 1B:
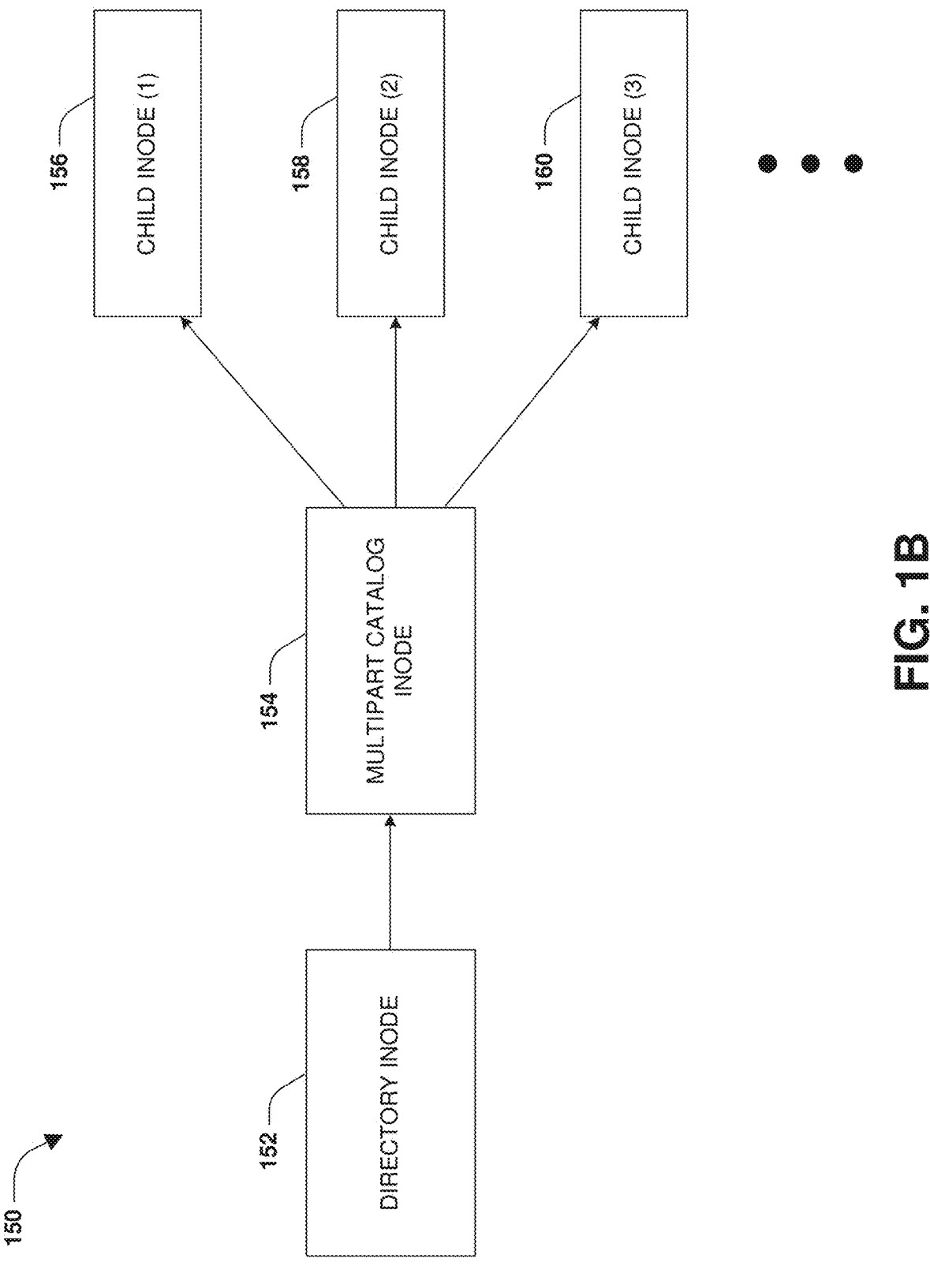
FIG. 1B is a block diagram illustrating an embodiment of a system for storing a multipart file, in accordance with an embodiment of the present technology.
Figure 1C:
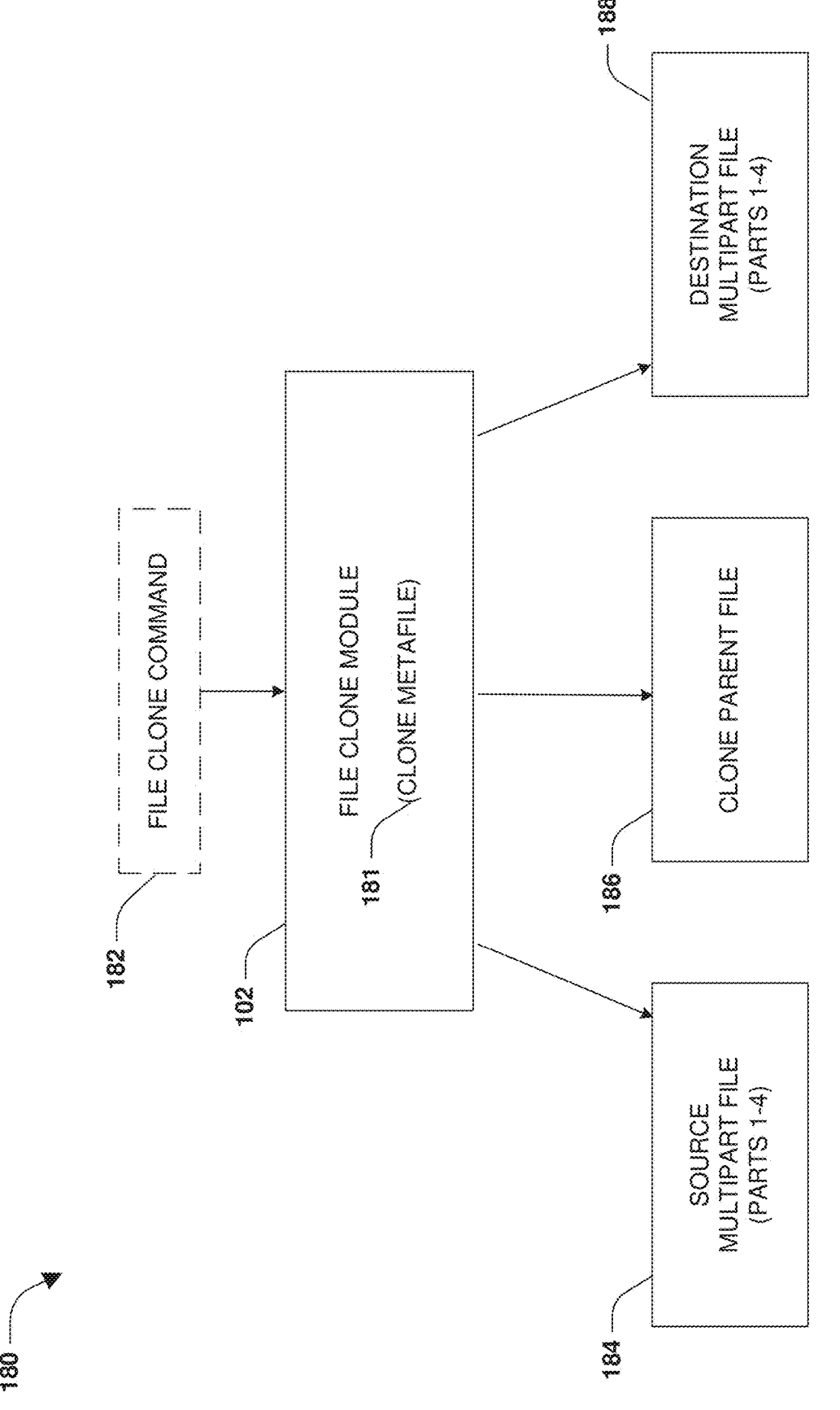
FIG. 1C is a block diagram illustrating an embodiment of a system for creating file clones of multipart files, in accordance with an embodiment of the present technology.

FIGS. 1A-1C are block diagrams illustrating an embodiment of a system 100 for creating file clones of multipart files. FIG. 1A illustrates a multipart file 104. The multipart file 104 may be exported to a client that will view the multipart file 104 as a single file that is referenced by a single file handle. The multipart file 104 may be composed of multiple parts such as a first part 112, a second part 114, a third part 116, and a fourth part 118. The individual parts are not exposed to the client, and are internally managed by a storage operating system or other storage service. The first part 112 may be stored within a volume hosted by a first node 106, the second part 114 may be stored within a volume hosted by a second node 108, the third part 116 may be stored within a volume hosted by the second node 108, and the fourth part 118 may be stored within a volume hosted by a third node 110. As the multipart file 104 grows, additional parts may be allocated at a particular node based upon various considerations such as load balancing and performance. When an operation, such as a read or write operation, for the multipart file 104 is received, the storage operating system or other storage service will identify the part that is storing data targeted by the operation. In this way, the operation is routed to the nodes hosting that parts for execution.

FIG. 1B illustrates an inode structure 150 of the multipart file 104. A directory inode 152 is for a directory that comprises the multipart file 104. A multipart catalog inode 154 is an inode of the multipart file 104. The multipart catalog inode 154 include catalog entries for each part of the multipart file 104. A catalog entry is a pointer to a part stored on a storage device at a node. Each part has a child inode, such as a first child inode 156 for the first part 112, a second child inode 158 for a second part 114, and a third child inode 160 for the third part 116.

In some embodiments, FIG. 1B illustrates an exemplary representation of an on-disk structure of a multipart inode of a multipart file. The multipart inode begins with a single top-level inode referred to as the multipart catalog inode

154. In some embodiments, the multipart catalog inode 154 implements a database (e.g., a database in a V+ format), and includes individual records. The individual records refer to the various child inodes. The child inodes provide a payload for the overall multipart inode (multipart file). In some embodiments where the database is a V+ database, the multipart catalog inode 154 contains both a user header area (e.g., a user header stored in file block number 0) and an expandable collection of database records.

In the multipart catalog inode 154, the user header conveys general properties of the collective object (e.g., the multipart file), while each of the individual records convey the identity of a child inode and describe the role of the child inode within the collective entity. In a Network Attached Storage (NAS), the multipart catalog inode 154 is pointed to by a directory (e.g., a directory associated the directory inode 152), and thus a file handle of the multipart catalog inode 154 is exposed to a client. The identities of the child inodes and topology rules that bind the child inodes together are cached for efficient access within the cluster. However, the client is not provided with file handles of the child inodes. In some embodiments, the topology rules may specify a number of parts of the multipart file, where the parts are stored such as within certain volumes or at certain nodes, a size of a part such that a new part is created once the part reaches that size, criteria for deleting a part such as when the part becomes empty or when data of the part can be consolidated with other parts, etc.

FIG. 1C illustrates a system 180 including a file clone module 102 configured to clone multipart files such as a source multipart file 184 (e.g., the multipart file 104) in constant time. A file clone command 182 may be received by the file clone module 102. The file clone command 182 may comprise an instruction to clone the source multipart file 184 one or more times. Accordingly, the file clone module 102 creates a clone parent file 186 as a temporary file during the cloning of the source multipart file 184 as a destination multipart file 188 and/or other destination multipart files based upon the number of file clones to create. The file clone module 102 evaluates the source multipart file 184 to identify catalog entries that point to a plurality of parts of the source multipart file 184 that are stored across different volumes and/or nodes (e.g., catalog entries for the first part 112, the second part 114, the third part 116, and the fourth part 118). The file clone module 102 moves the catalog entries from the source multipart file 184 into the clone parent file 186 so that the catalog entries now reside at the clone parent file 186 and point to the parts of the source multipart file 184. Because the catalog entries are moved from the source multipart file 184, the source multipart file 184 may become empty or sparse. Moving the catalog entries is a quick and efficient process.

The file clone module 102 creates the destination multipart file 188 that may be initially empty or sparse, and thus the destination multipart file 188 and/or any other file clones of the source multipart file 184 can be quickly and efficiently created. The file clone module 102 performs block sharing of the catalog entries that were moved to the clone parent file 186. In particular, block sharing is performed so that the source multipart file 184 and/or the destination multipart file 188 share (point to) blocks storing the catalog entries of the clone parent file 186. Block sharing of the catalog entries is a quick and efficient process. In this way, the clone parent file 186 includes the catalog entries that are stored within blocks of data, and the source multipart file 184 and/or the destination multipart file 188 point to those blocks, and thus share the catalog entries of the clone parent file 186. This block sharing by the source multipart file 184 and/or the destination multipart file 188 to the blocks storing the catalog entries of the clone parent file 106 is recorded as a multipart file clone relationship within a clone metafile 181 by the file clone module 102. The multipart file clone relationship and clone metafile 181 are used to track which parts of the source multipart file 184 are pending to be cloned to the destination multipart file 188. Accordingly, the file clone command 182 is acknowledged as complete even though the parts of the source multipart file 184 have not yet been cloned to the destination multipart file 188. In this way, the file clone command 182 can be acknowledged as complete in a constant time such as within a few seconds or less. The actual cloning (block sharing) of the parts of the source multipart file 184 to the destination multipart file 188 are performed as a background process or on-demand as operations are received and executed.

Figure 3:
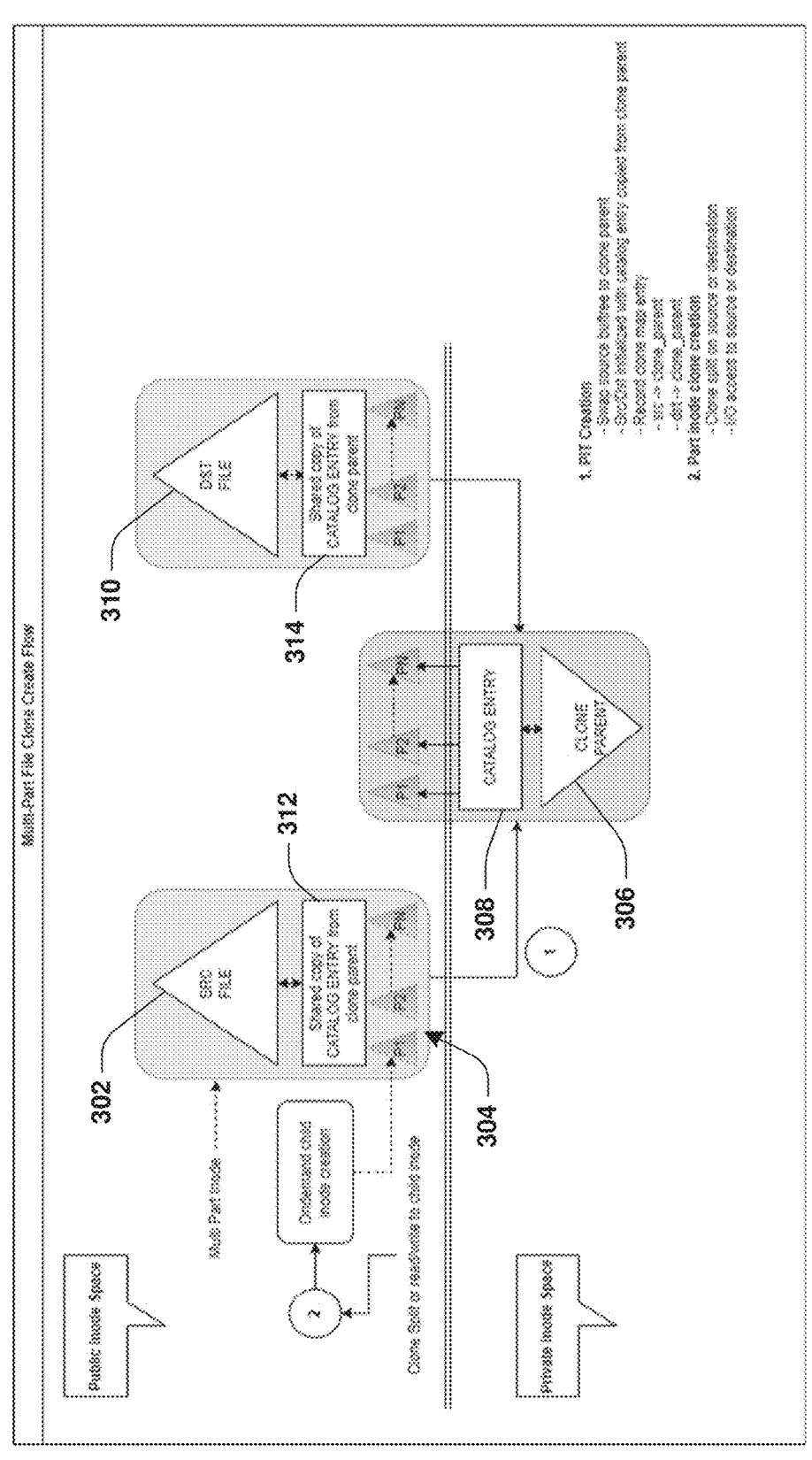
FIG. 3 is a block diagram illustrating an embodiment of a system for creating file clones of multipart files, in accordance with an embodiment of the present technology.

FIG. 2 is a flow chart illustrating an embodiment of a method 200 for creating file clones of multipart files, which is described in conjunction with system 300 of FIG. 3. A source multipart file 302 may be maintained within a public inode space where clients are provided with access to the source multipart file 302. The source multipart file 302 may include a plurality of parts 304 that are stored across different volumes and/or at different nodes of a cluster. The source multipart file 302 includes catalog entries that point to the plurality of parts 304 stored on disk.

During operation 202 of method 200, a file clone command may be received to create a clone of the source multipart file 302. The file clone command may request any number of clones to be created for the source multipart file 302, which can be created in constant time (e.g., within a few seconds or less) regardless of the size of the source multipart file 302 or the number of clones to create. As part of executing the file clone command, a clone parent file 306 is created (e.g., created as a temporary and/or as an empty file). The clone parent file 306 may be created within a private inode space such that the clone parent file 306 is hidden from clients. The private inode space is separate from the public inode space within which the source multipart file 302 and child inodes of the plurality of parts of the source multipart file 302 are located.

During operation 204 of method 200, the catalog entries are moved from the source multipart file 302 to the clone parent file 306 as catalog entries 308. This results in the source multipart file 302 becoming an empty/spare file that no longer comprises the catalog entries. In some embodiments, the catalog entries 308 are moved by swapping a source buftree of the source multipart file 302 to the clone parent file 306 so that the clone parent file 306 is a point-in-time copy of the source multipart file 302. A buftree may correspond to catalog entries of a multipart file. The child inodes of the parts of the source multipart file 302 may still reside in the public inode space, but are now pointed to by the clone parent file 306 using the catalog entries 308.

During operation 206 of method 200, a destination multipart file 310 is created as a file clone for the source multipart file 302 (e.g., a clone destination inode is created). In some embodiments, the destination multipart file 310 may be created as an empty/sparse file. In some embodiments, the destination multipart file 310 may be created within the public inode space such that clients are provided with access to the destination multipart file 310 along with the source multipart file 302. For example, the clients may be provided with access to the source multipart file 302 and/or the destination multipart file 310 once the file clone command is acknowledged, even though the parts of the source multipart file 302 have not yet been cloned to the destination multipart file 310. In some embodiments, client I/O operations directed to a sparse/empty multipart file are blocked, failed, or queued (e.g., the source and/or destination multipart files may be sparse/empty at certain points during the execution of the file clone command). Once the catalog entries are populated/available for a multipart file, then the client I/O operations are allowed. Performing the block sharing operation during the file clone command ensures that the catalog entries are shared/copied from the clone parent file 306 to the source multipart file 302 and the destination multipart file 310, and thus the source multipart file 302 and the destination multipart file 310 will no longer be sparse/empty.

During operation 208 of method 200, block sharing is performed for the catalog entries 308 that were moved to the clone parent file 306. The block sharing is performed such that the source multipart file 302 now shares 312 blocks of storage that are storing the catalog entries 308 of the clone parent file 306. The block sharing is performed such that the destination multipart file 310 now shares 314 the blocks of storage that are storing the catalog entries 308 of the clone parent file 306.

In some embodiments, an indicator is maintained within a user header of the source multipart file 302 and/or the destination multipart file 310. The indicator is maintained as a clone generation value set to indicate whether a child inode of a part has been cloned for the destination multipart file 310 or is pending to be cloned. In some embodiments, the indicator is maintained as a hint in the form of a 4 byte epoch-based clone generation value, which can be used to determine whether the child inode has been cloned or not.

In some embodiments, a clone generation value is assigned to a child inode of a part. When a new child inode is allocated as a clone of the child inode (e.g., as part of a subsequent process where the parts are cloned to the destination multipart file 310), the clone generation value is assigned to the new child inode to indicate that the part has been cloned. In some embodiments, generation values are compared between the generation value stored in a user header of the source/destination multipart file and a corresponding generation value stored in a part itself. Assume that there is a multipart file F1 with four parts P1, P2, P3, and P4 in the multipart file F1. Initially, the multipart file F1 is assigned the generation value as X in a user header of the multipart file F1. The parts P1, P2, P3, and P4 in the multipart file F1 are also assigned the generation value of X. After the file clone command is declared complete, the user header of the multipart file F1 is assigned the generation value of X+1 (e.g., a generation value in a user header of a multipart file is incremented when a file clone command is declared complete) so that all the existing parts P1, P2, P3, and P4 pointed to by the multipart file F1 will be invalidated because the parts P1, P2, P3, and P4 have the mismatching generation value of X. When the individual parts P1, P2, P3, and P4 are subsequently cloned and stitched back to multipart file F1, then the individual parts P1, P2, P3, and P4 will be assigned the generation value of X+1.

In some embodiments, assume that when the source multipart file 302 is first created, a clone generation value of X is assigned to the source multipart file 302. While creating a clone of the source multipart file 302, a source buftree (catalog entries) are moved to the clone parent file 306. At this point, all parts of the source multipart file 30 are pointed to by clone parent file 306. Subsequently, the catalog entries are copied back to the source multipart file 302 and destination multipart file 310 by doing block sharing. Once the block sharing is complete, the catalog entries have the clone generation value of X, and the parts of the source multipart file 302 have been assigned (stamped) with that clone generation value of X during their creation.

During clone creation, the clone generation value may be increased to X+1, and is assigned to the catalog entries of the source multipart file 302 and destination multipart file 310. At this point, the clone generation value of X+1 is assigned to catalog entries of the source multipart file 302 and destination multipart file 310, whereas all existing parts pointed to by the clone parent file 306 have the clone generation value of X. So while performing I/O directed to the source multipart file 302 and/or the destination multipart file 310, the clone generation values are compared. If there is a mismatch between a clone generation value of a catalog entry (X+1) and the clone generation value (X) of a part of a multipart file targeted by an I/O operation (e.g., X!=X+1), then the mismatch is an indication that this part is not yet cloned. When cloning of the part is complete, the part and/or the cloned part is assigned the clone generation value of X+1. So during the processing of a next I/O operation after the cloning of the part, both the catalog entry within the multipart file and the part have the same clone generation values of X+1, which means that the corresponding part representing certain file FBN ranges is already cloned. Thus, the I/O operation can be directly issued/executed.

A multipart file clone relationship of the source multipart file 302 and destination multipart file 310 to the clone parent file 306 (e.g., the source multipart file 302 and destination multipart file 310 pointing to the blocks storing the catalog entries 308 of the clone parent file 306 as a result of the blocking sharing) is recorded within a clone metafile. The multipart file clone relationship may indicate that the parts are pending to be cloned from the source multipart file 302 to the destination multipart file 310.

At this point, the file clone command is acknowledged as complete, which has occurred within a constant time such as within a few seconds or less. The parts will be subsequently cloned from the source multipart file 302 to the destination multipart file 310.

An operation may be received as part of incoming I/O. The operation may target a target multipart file (e.g., either the source multipart file 302 or the destination multipart file 310), such as before the parts of the source multipart file 302 have been fully cloned from the source multipart file 302 to the destination multipart file 310. During operation 210 of method 200, a determination is made as to whether the operation targets a child inode that has been cloned or targets a child inode that is pending to be cloned. In particular, a lookup to the target multipart file is performed to determine whether a clone generation value of a child inode matches a stored clone generation value within a user header of the target multipart file for a given file block number range targeted by the operation. In this way, a determination is made as to whether the child inode has been cloned and is locally available.

If the child inode has not been cloned (e.g., there is a clone generation value mismatch), then the child inode is created on-demand and the operation is restarted (on-demand child inode creation is performed), during operation 212 of method 200. In particular, a child cloning request may be issued on-demand to clone the child inode as the child inode clone. The child cloning request is executed to retrieve a child clone file handle that is stitched into the target multipart file. The operation is restarted to target the child inode clone. If the child inode has been cloned (e.g., there is a clone generation value match), then the operation is executed upon the child inode clone, during operation 214 of method 200.

In some embodiments, remaining child inode clones are created as a background process by traversing through the child inodes (catalog entries) of the clone parent file 306. In some embodiments, a clone split operation is performed on the destination multipart file 310 to create child inode clones from the clone parent file 306. The catalog entries of the clone parent file 306 are traversed to issue child inode clone create requests for child inodes that do not have a corresponding child inode clone. The catalog entries are updated with the child inode clones created based upon the clone create requests. A split operation is performed upon the child inode clones, and block sharing operations are performed for the child inode clones. In this way, the destination multipart file 310 is split from the source multipart file 302.

Figure 5:
FIG. 5 is a block diagram illustrating an embodiment of a system for creating file clones of multipart files, where an operation is executed upon a multipart file, in accordance with various embodiments of the present technology.
Figure 6A:
FIG. 6A is a block diagram illustrating an embodiment of a system for creating file clones of multipart files, where an operation is executed upon a multipart file, in accordance with various embodiments of the present technology.
Figure 6B:
FIG. 6B is a block diagram illustrating an embodiment of a system for creating file clones of multipart files, where an operation is executed upon a multipart file, in accordance with various embodiments of the present technology.

FIG. 4 is a flow chart illustrating an embodiment of a method 400 for creating file clones of multipart files, which is described in conjunction with system 500 of FIG. 5 and system 600 of FIGS. 6A and 6B. A node 504 may host the file clone module 102 configured to clone multipart files, such as to clone a source multipart file 508 as a destination multipart file 512 where a clone parent file 510 is used as a temporary file to store catalog entries moved from the source multipart file 508 to the clone parent file 510. The node 504 may provide a client 502 with access to the source multipart file 508 and/or the destination multipart file 512. The node 504 may process operations from clients after a file clone command is acknowledged as completed, but before parts of the source multipart file 508 have been cloned, such as through block sharing, with the destination multipart file 512.

During operation 402 of method 400, an operation 506 may be received by the node 504 from the client 502. The operation 506 may target a target multipart file such as either the source multipart file 508 or the destination multipart file 512. During operation 404 of method 400, the node 504 may perform a lookup to the target multipart file is performed to determine whether a clone generation value of a child inode matches a stored clone generation value within a user header of the target multipart file for a given file block number range targeted by the operation 506. In this way, the lookup is performed to make a determination as to whether the child inode has been cloned and is locally available.

During operation 406 of method 400, a determination is made as to whether the clone generation value of the child inode and the stored clone generation value within the user header of the target multipart file match. During operation 408 of method 400, if the clone generation value and the stored clone generation value match, then the operation 506 is executed upon the target multipart file, such as upon the child inode clone of the cloned part of the target multipart inode (e.g., executed 514 upon the destination multipart file 512, as illustrated by FIG. 5). In this way, a response 516 is provided back to the client 502 for the operation 506.

During operation 410 of method 400, if the clone generation value and the stored clone generation value do not match, then the operation 506 is paused. During operation 412 of method 400, a child cloning request 614 is on-demand issued to clone the child inode as a child inode clone, as illustrated by FIG. 6A. During operation 414 of method 400, the operation 506 is resumed and executed upon the target multipart file, such as upon the child inode clone of the cloned part of the target multipart inode (e.g., executed 620 upon the destination multipart file 512, as illustrated by FIG. 6B). In this way, the response 516 is provided back to the client 502 for the operation 506.

Figure 7:
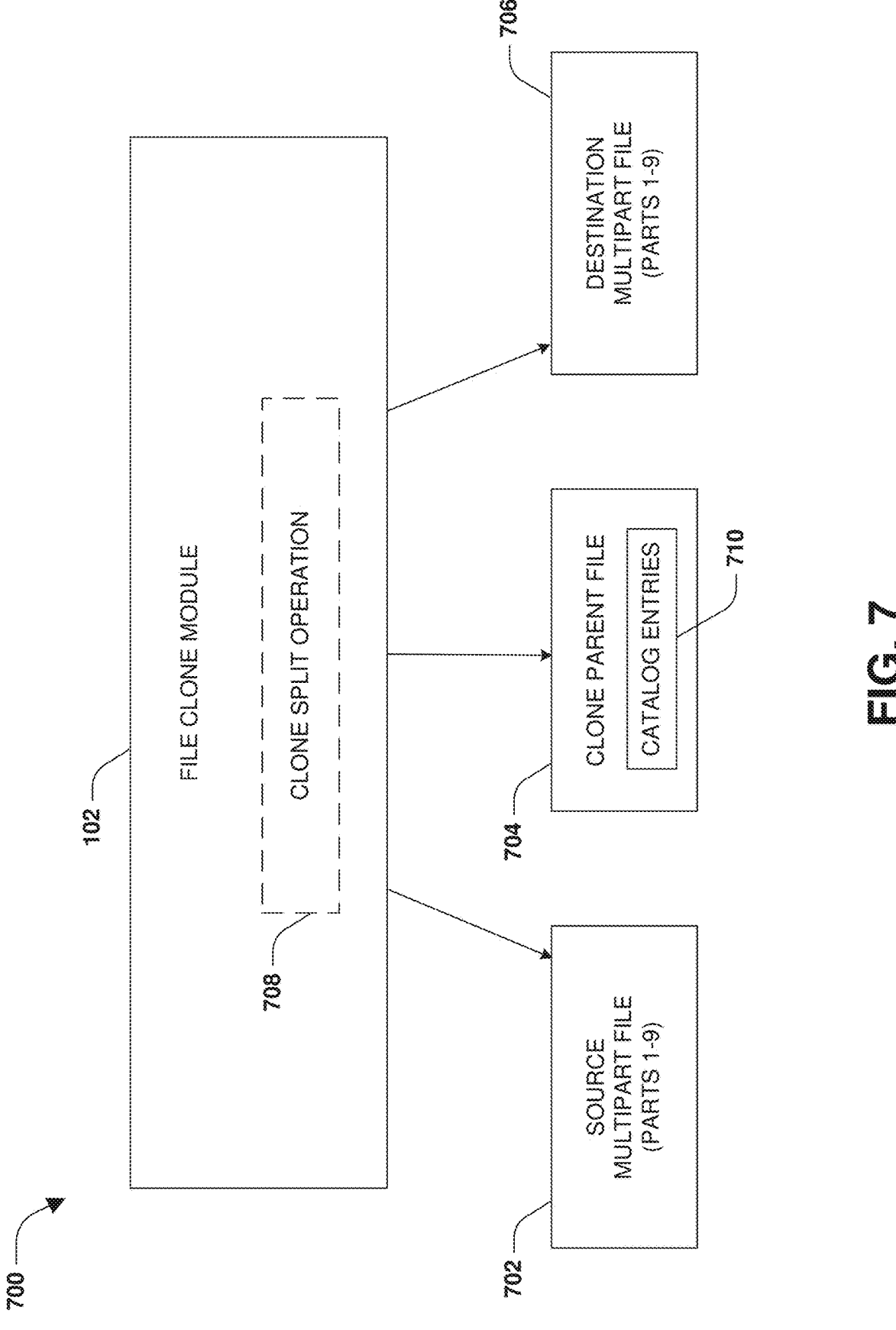
FIG. 7 is a block diagram illustrating an embodiment of a system for performing a clone split operation, where a clone split operation is performed, in accordance with various embodiments of the present technology.

FIG. 7 is a block diagram illustrating an embodiment of a system 700 for performing a clone split operation 708. The file clone module 102 may have cloned a source multipart file 702 as a destination multipart file 706 using a clone parent file 704 as a temporary file to store catalog entries moved from the source multipart file 702 to the clone parent file 704. Block sharing may have been performed so that the source multipart file 702 and the destination multipart file 706 point to blocks of storage that store the catalog entries of the clone parent file 704.

The file clone module 102 may implement a clone split operation upon the destination multipart file 706 to split the destination multipart file 706 from the source multipart file 702 (e.g., to make the destination multipart file 706 a standalone multipart file). The clone split operation 708 is executed to create child inode clones from the clone parent file 704. In particular, the catalog entries 710 of the clone parent file 704 are traversed to issue child inode clone create requests for child inodes that do not have a corresponding child inode clone. In this way, the catalog entries 710 are updated with child inode clones created based upon the clone create requests to complete the execution of the clone split operation 708.

In some embodiments, a method is provided. The method includes receiving a file clone command to create a file clone of a source multipart file that includes a plurality of parts distributed across volumes hosted by different nodes of a cluster; creating a clone parent file; moving catalog entries of the source multipart file to the clone parent file, wherein the catalog entries point to the plurality of parts of the source multipart file; creating a destination multipart file as the file clone for the source multipart file; performing block sharing of the catalog entries of the clone parent file with the source multipart file and the destination multipart file; recording, within a clone metafile, a multipart file clone relationship of the source multipart file and the destination multipart file to the clone parent file to indicate that clone operations for the plurality of parts are pending; and acknowledging the file clone command as complete.

In some embodiments, the method comprises maintaining an indicator within a user header of the source multipart file as a clone generation value set to indicate whether a child inode of a part of the plurality of parts has been cloned or is pending to be cloned.

In some embodiments, the method comprises maintaining an indicator within a user header of the destination multipart file as a clone generation value set to indicate whether a child inode of a part of the plurality of parts has been cloned or is pending to be cloned.

In some embodiments, the method comprises assigning a clone generation value to a child inode of a part of the plurality of parts of the source multipart file; and in response to allocating a new child inode as a clone of the child inode of the part for the destination multipart file, assigning the clone generation value to the new child inode to indicate that the part has been cloned.

In some embodiments, the method comprises in response to detecting a clone generation value mismatch between the child inode and the new child inode, determining that the part has not yet been cloned.

In some embodiments, the method comprises creating the clone parent file within a private inode space separate from a public inode space within which child inodes of the source multipart file and the destination multipart file are stored.

In some embodiments, the method comprises executing a clone split operation on the destination multipart file to create child inode clones from the clone parent file; traversing the catalog entries of the clone parent file to issue child inode clone create requests for child inodes that do not have a corresponding child inode clone; and updating the catalog entries with child inode clones created based upon the clone create requests.

In some embodiments, the method comprises executing a split operation upon the child inode clones; and performing a block sharing operation for the child inode clones.

In some embodiments, a computing device is provided. The computing device comprises a memory comprising machine executable code; and a processor coupled to the memory, the processor configured to execute the machine executable code to cause the machine to perform operations comprising: receiving a file clone command to create a file clone of a source multipart file that includes a plurality of parts distributed across volumes hosted by different nodes of a cluster; creating a clone parent file; moving catalog entries of the source multipart file to the clone parent file, wherein the catalog entries point to the plurality of parts of the source multipart file; creating a destination multipart file as the file clone for the source multipart file; performing block sharing of the catalog entries of the clone parent file with the source multipart file and the destination multipart file; recording, within a clone metafile, a multipart file clone relationship of the source multipart file and the destination multipart file to the clone parent file to indicate that clone operations for the plurality of parts are pending; and acknowledging the file clone command as complete.

In some embodiments, the machine executable code causes the machine to receive an operation targeting the destination multipart file; create a child clone inode on-demand in response to receiving the operation; and execute the operation upon the child clone inode.

In some embodiments, the machine executable code causes the machine to receive an operation targeting the destination multipart file; perform a lookup to the destination multipart file to determine whether a clone generation value of a child inode matches a stored clone generation value within a user header of the destination multipart file for a given file block number range targeted by the operation to determine whether the child inode has been cloned and is locally available; and in response to the child inode being cloned as a child inode clone, execute the operation upon the child inode clone.

In some embodiments, the machine executable code causes the machine to in response to the child inode not being cloned, pause the operation and on-demand issue a child cloning request to clone the child inode as the child inode clone; and restart the operation to target the child inode clone.

In some embodiments, the machine executable code causes the machine to execute the child cloning request to retrieve a child clone file handle; stitch the child clone file handle into the destination multipart file; and restart the operation to target the child inode clone.

In some embodiments, the machine executable code causes the machine to receive an operation targeting the source multipart file; create a child clone inode on-demand in response to receiving the operation, wherein a child clone file handle is stitched into the destination multipart file; and execute the operation upon the child clone inode.

In some embodiments, the machine executable code causes the machine to create remaining child inode clones as a background process by traversing through child inodes of the clone parent file.

In some embodiments, a non-transitory machine readable medium is provided. The non-transitory machine readable medium comprises instructions for performing a method, which when executed by a machine, causes the machine to perform operations comprising: receiving a file clone command to create a file clone of a source multipart file that includes a plurality of parts distributed across volumes hosted by different nodes of a cluster; creating a clone parent file; moving catalog entries of the source multipart file to the clone parent file, wherein the catalog entries point to the plurality of parts of the source multipart file; creating a destination multipart file as the file clone for the source multipart file; performing block sharing of the catalog entries of the clone parent file with the source multipart file and the destination multipart file; recording, within a clone metafile, a multipart file clone relationship of the source multipart file and the destination multipart file to the clone parent file to indicate that clone operations for the plurality of parts are pending; and acknowledging the file clone command as complete.

In some embodiments, the instructions cause the machine to: receive an operation targeting the destination multipart file during operation of the file clone command; perform a lookup to the destination multipart file to determine whether a clone generation value of a child inode matches a stored clone generation value within a user header of the destination multipart file for a given file block number range targeted by the operation to determine whether the child inode has been cloned and is locally available; and in response to the child inode being cloned as a child inode clone, execute the operation upon the child inode clone.

In some embodiments, the instructions cause the machine to: receive an operation targeting the destination multipart file during operation of the file clone command; in response to determine that a child inode has not been cloned, pause the operation and on-demand issue a child cloning request to clone the child inode as the child inode clone; and restart the operation to target the child inode clone.

In some embodiments, the instructions cause the machine to: maintain an indicator within a user header of the source multipart file as a clone generation value set to indicate whether a child inode of a part of the plurality of parts has been cloned or is pending to be cloned.

In some embodiments, the instructions cause the machine to: receive an operation targeting the destination multipart file; create a child clone inode on-demand in response to receiving the operation; and execute the operation upon the child clone inode.

Figure 8:
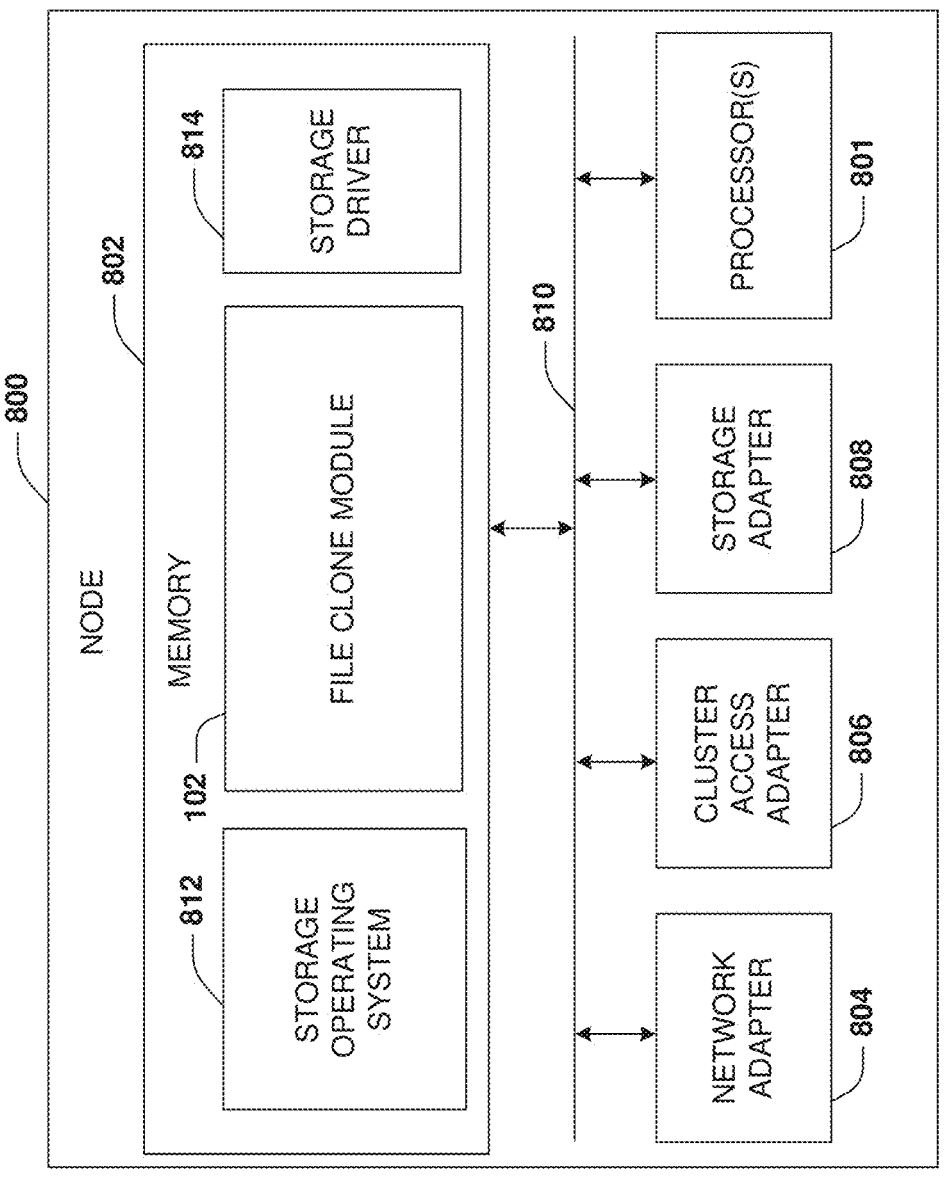
FIG. 8 is a block diagram illustrating an example of a node in accordance with various embodiments of the present technology.

Referring to FIG. 8, a node 800 (also referred to as a storage node) in this particular example includes processor (s) 801, a memory 802, a network adapter 804, a cluster access adapter 806, and a storage adapter 808 interconnected by a system bus 810. In other examples, the node 800 comprises a virtual machine, such as a virtual storage machine.

The node 800 also includes a storage operating system 812 installed in the memory 802 that can, for example, implement a RAID data loss protection and recovery scheme to optimize reconstruction of data of a failed disk or drive in an array, along with other functionality such as deduplication, snapshot creation, data mirroring, synchronous replication, asynchronous replication, encryption, etc.

The network adapter 804 in this example includes the mechanical, electrical and signaling circuitry needed to connect the node 800 to one or more of the client devices over network connections, which may comprise, among other things, a point-to-point connection or a shared medium, such as a local area network. In some examples, the network adapter 804 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 808 cooperates with the storage operating system 812 executing on the node 800 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 808 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 808 and, if necessary, processed by the processor(s) 801 (or the storage adapter 808 itself) prior to being forwarded over the system bus 810 to the network adapter 804 (and/or the cluster access adapter 806 if sending to another node computing device in the cluster) where the information is formatted into a data packet and returned to a requesting one of the client devices and/or sent to another node computing device attached via a cluster fabric. In some examples, a storage driver 814 in the memory 802 interfaces with the storage adapter to facilitate interactions with the data storage devices.

The storage operating system 812 can also manage communications for the node 800 among other devices that may be in a clustered network, such as attached to the cluster fabric. Thus, the node 800 can respond to client device requests to manage data on one of the data storage devices or storage devices of the distributed storage system in accordance with the client device requests.

A file system module of the storage operating system 812 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 800, memory 802 can include storage locations that are addressable by the processor(s) 801 and adapters 804, 806, and 808 for storing related software application code and data structures. The processor(s) 801 and adapters 804, 806, and 808 may, for example, include processing elements and/or logic circuitry configured to execute the software code and manipulate the data structures.

The storage operating system 812, portions of which are typically resident in the memory 802 and executed by the processor(s) 801, invokes storage operations in support of a file service implemented by the node 800. Other processing and memory mechanisms, including various computer readable media, may be used for storing and/or executing application instructions pertaining to the techniques described and illustrated herein.

In some embodiments, the file clone module 102 is implemented by the node 800 in order to create file clones of multipart files using the disclosed techniques described in relation to FIGS. 1A-7.

The examples of the technology described and illustrated herein may be embodied as one or more non-transitory computer or machine readable media, such as the memory 802, having machine or processor-executable instructions stored thereon for one or more aspects of the present technology, which when executed by processor(s), such as processor(s) 801, cause the processor(s) to carry out the steps necessary to implement the methods of this technology, as described and illustrated with the examples herein. In some examples, the executable instructions are configured to perform one or more steps of a method described and illustrated later.

Figure 9:
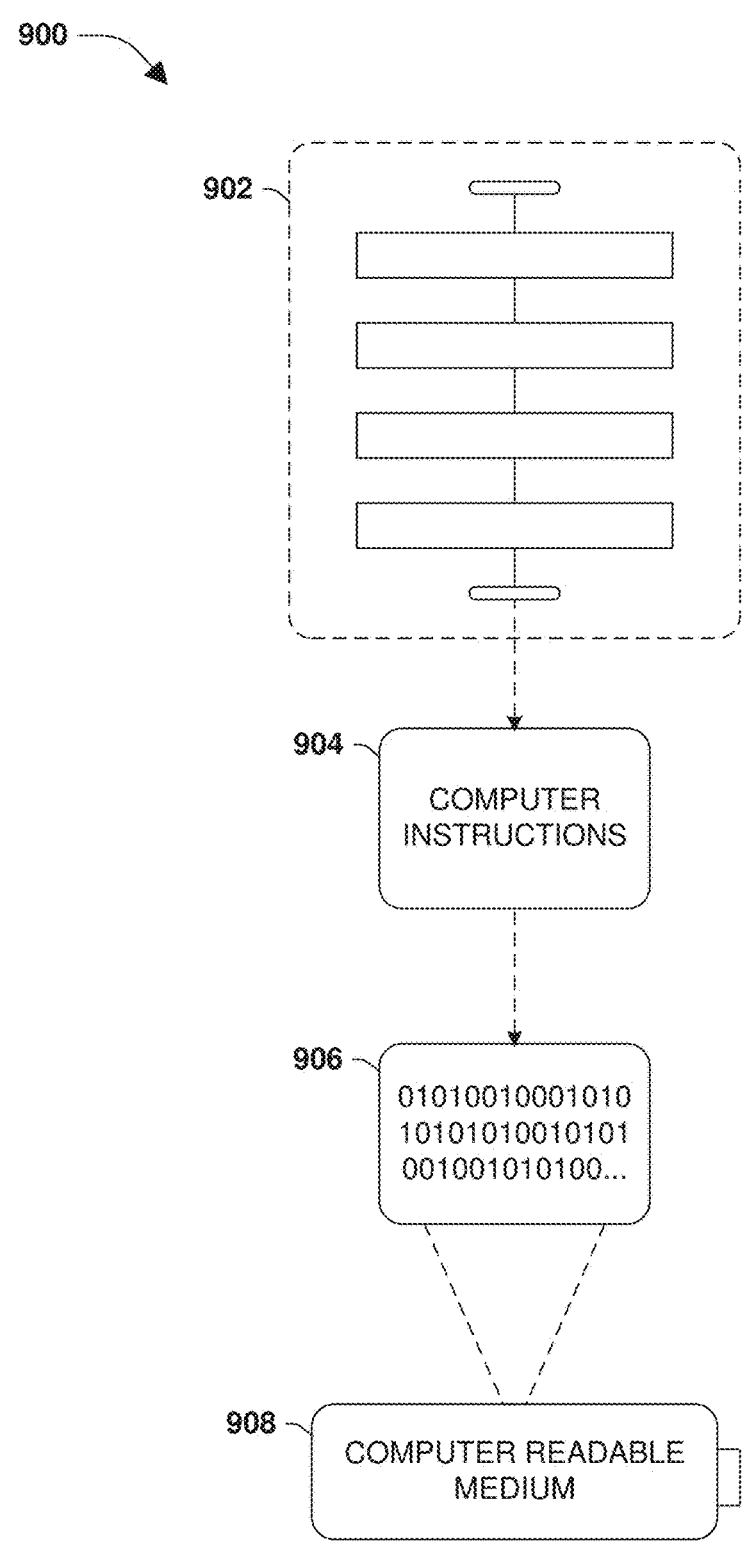
FIG. 9 is an example of a computer readable medium in accordance with various embodiments of the present technology.

FIG. 9 is an example of a computer readable medium 900 in which various embodiments of the present technology may be implemented. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. The computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform at least some of the exemplary methods 902 disclosed herein, such as method 200 of FIG. 2 and/or method 400 of FIG. 4, for example. In some embodiments, the processor-executable computer instructions 904 are configured to implement a system, such as at least some of the exemplary systems disclosed herein, such as system 100 of FIGS. 1A-1C, system 300 of FIG. 3, system 500 of FIG. 5, system 600 of FIGS. 6A and 6B, system 700 of FIG. 7, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method executed by a file clone module implemented by a computer, the method comprising:
    receiving a file clone command to create a file clone of a source multipart file that includes a plurality of parts distributed across volumes hosted by different nodes of a cluster;
    creating a clone parent file;
    moving catalog entries of the source multipart file to the clone parent file, wherein the catalog entries point to the plurality of parts of the source multipart file, and wherein the catalog entries are removed from the source multipart file;
    creating a destination multipart file as the file clone for the source multipart file;

performing block sharing of the catalog entries of the clone parent file back to the source multipart file and the catalog entries of the clone parent file to the destination multipart file;
recording, within a clone metafile, a first multipart file clone relationship of the source multipart file to the clone parent file and a second multipart file clone relationship of the destination multipart file to the clone parent file to indicate that clone operations are pending to clone the plurality of parts from the source multipart file to the destination multipart file; and
acknowledging the file clone command as complete.

2. The method of claim 1, comprising:
maintaining an indicator within a user header of the source multipart file as a clone generation value set to indicate whether a child inode of a part of the plurality of parts has been cloned or is pending to be cloned.

3. The method of claim 1, comprising:
maintaining an indicator within a user header of the destination multipart file as a clone generation value set to indicate whether a child inode of a part of the plurality of parts has been cloned or is pending to be cloned.

4. The method of claim 1, comprising:
assigning a clone generation value to a child inode of a part of the plurality of parts of the source multipart file; and
in response to allocating a new child inode as a clone of the child inode of the part for the destination multipart file, assigning the clone generation value to the new child inode to indicate that the part has been cloned.

5. The method of claim 4, comprising:
in response to detecting a clone generation value mismatch between the child inode and the new child inode, determining that the part has not yet been cloned.

6. The method of claim 1, wherein the creating the clone parent file comprises:
    creating the clone parent file within a private inode space separate from a public inode space within which child inodes of the source multipart file and the destination multipart file are stored.

7. The method of claim 1, comprising:
executing a clone split operation on the destination multipart file to create child inode clones from the clone parent file;
traversing the catalog entries of the clone parent file to issue child inode clone create requests for child inodes that do not have a corresponding child inode clone; and
updating the catalog entries with child inode clones created based upon the clone create requests.

8. The method of claim 7, comprising:
executing a split operation upon the child inode clones; and
performing a block sharing operation for the child inode clones.

9. A computing device, comprising:
a memory comprising machine executable code; and
a processor coupled to the memory, the processor configured to execute the machine executable code to cause the machine to:
    receive a file clone command to create a file clone of a source multipart file that includes a plurality of parts distributed across volumes hosted by different nodes of a cluster;
    create a clone parent file;
    move catalog entries of the source multipart file to the clone parent file, wherein the catalog entries point to the plurality of parts of the source multipart file, and wherein the catalog entries are removed from the source multipart file;

create a destination multipart file as the file clone for the source multipart file;

perform block sharing of the catalog entries of the clone parent file back to the source multipart file and the catalog entries of the clone parent file to the destination multipart file;

record, within a clone metafile, a first multipart file clone relationship of the source multipart file to the clone parent file and a second multipart file clone relationship of the destination multipart file to the clone parent file to indicate that clone operations are pending to clone the plurality of parts from the source multipart file to the destination multipart file; and acknowledge the file clone command as complete.

10. The computing device of claim 9, wherein the machine executable code causes the machine to:

receive an operation targeting the destination multipart file;

create a child clone inode on-demand in response to receiving the operation; and execute the operation upon the child clone inode.

11. The computing device of claim 9, wherein the machine executable code causes the machine to:

receive an operation targeting the destination multipart file;

evaluate a header of the destination multipart file to identify a stored clone generation value for a given file block number range targeted by the operation;

determine whether the stored clone generation value and a clone generation value of a child inode match;

in response to identifying a match, determining that the child inode has been cloned as a child inode clone that is locally available for access by the operation; and in response to the child inode being cloned as the child inode clone, execute the operation upon the child inode clone.

12. The computing device of claim 11, wherein the machine executable code causes the machine to:

in response to the child inode not being cloned, pause the operation and on-demand issue a child cloning request to clone the child inode as the child inode clone; and restart the operation to target the child inode clone.

13. The computing device of claim 12, wherein the machine executable code causes the machine to:

execute the child cloning request to retrieve a child clone file handle;

stitch the child clone file handle into the destination multipart file; and restart the operation to target the child inode clone.

14. The computing device of claim 9, wherein the machine executable code causes the machine to:

receive an operation targeting the source multipart file;

create a child clone inode on-demand in response to receiving the operation, wherein a child clone file handle is stitched into the destination multipart file; and execute the operation upon the child clone inode.

15. The computing device of claim 9, wherein the machine executable code causes the machine to:

create remaining child inode clones as a background process by traversing through child inodes of the clone parent file.

16. A non-transitory machine readable medium comprising instructions for performing a method, which when executed by a machine, causes the machine to:

receive a file clone command to create a file clone of a source multipart file that includes a plurality of parts distributed across volumes hosted by different nodes of a cluster;

create a clone parent file;

move catalog entries of the source multipart file to the clone parent file, wherein the catalog entries point to the plurality of parts of the source multipart file, and wherein the catalog entries are removed from the source multipart file;

create a destination multipart file as the file clone for the source multipart file;

perform block sharing of the catalog entries of the clone parent file back to the source multipart file and the catalog entries of the clone parent file to the destination multipart file;

record, within a clone metafile, a first multipart file clone relationship of the source multipart file to the clone parent file and a second multipart file clone relationship of the destination multipart file to the clone parent file to indicate that clone operations are pending to clone the plurality of parts from the source multipart file to the destination multipart file; and acknowledge the file clone command as complete.

17. The non-transitory machine readable medium of claim 16, wherein the instructions cause the machine to:

receive an operation targeting the destination multipart file during operation of the file clone command;

evaluate a header of the destination multipart file to identify a stored clone generation value for a given file block number range targeted by the operation;

determine whether the stored clone generation value and a clone generation value of a child inode match;

in response to identifying a match, determining that the child inode has been cloned as a child inode clone that is locally available for access by the operation; and in response to the child inode being cloned as the child inode clone, execute the operation upon the child inode clone.

18. The non-transitory machine readable medium of claim 16, wherein the instructions cause the machine to:

receive an operation targeting the destination multipart file during operation of the file clone command;

in response to determine that a child inode has not been cloned, pause the operation and on-demand issue a child cloning request to clone the child inode as the child inode clone; and restart the operation to target the child inode clone.

19. The non-transitory machine readable medium of claim 16, wherein the instructions cause the machine to:

maintain an indicator within a user header of the source multipart file as a clone generation value set to indicate whether a child inode of a part of the plurality of parts has been cloned or is pending to be cloned.

20. The non-transitory machine readable medium of claim 16, wherein the instructions cause the machine to:

receive an operation targeting the destination multipart file;

create a child clone inode on-demand in response to receiving the operation; and execute the operation upon the child clone inode.

* * * * *